(12) United States Patent
Cindric

(10) Patent No.: US 9,971,334 B2
(45) Date of Patent: May 15, 2018

(54) INSCRIPTION POSITIONING APPARATUSES, SYSTEMS, AND METHODS OF MAKING AND USING THE SAME

(71) Applicant: Kwik Mark, Inc., McHenry, IL (US)

(72) Inventor: Emil Cindric, McHenry, IL (US)

(73) Assignee: Kwik Mark, Inc., McHenry, IL (US)

( * ) Notice: Subject to any disclaimer, the term of this patent is extended or adjusted under 35 U.S.C. 154(b) by 331 days.

(21) Appl. No.: 15/066,052

(22) Filed: Mar. 10, 2016

(65) Prior Publication Data
US 2016/0299486 A1 Oct. 13, 2016

Related U.S. Application Data

(60) Provisional application No. 62/145,023, filed on Apr. 9, 2015.

(51) Int. Cl.
| | |
|---|---|
| G06F 19/00 | (2018.01) |
| G05B 19/18 | (2006.01) |
| B44B 3/06 | (2006.01) |
| B44B 3/00 | (2006.01) |
| G05B 19/401 | (2006.01) |

(52) U.S. Cl.
CPC .......... G05B 19/182 (2013.01); *B44B 3/009* (2013.01); *B44B 3/061* (2013.01); *G05B 19/401* (2013.01); *G05B 2219/45212* (2013.01)

(58) Field of Classification Search
CPC .... G05B 19/401; G05B 19/182; B44B 3/061; B44B 3/009
See application file for complete search history.

(56) References Cited

U.S. PATENT DOCUMENTS

| | | | |
|---|---|---|---|
| 4,799,172 A | 1/1989 | Wood et al. | |
| 5,251,555 A * | 10/1993 | Speicher | B44B 5/0095 101/93.04 |
| 5,343,401 A | 8/1994 | Goldberg et al. | |
| 5,649,216 A | 7/1997 | Sieber | |
| 6,504,544 B1 | 1/2003 | Hollingsworth et al. | |
| 6,911,980 B1 | 6/2005 | Newell et al. | |
| 7,412,360 B2 | 8/2008 | Surazhsky et al. | |
| 7,856,285 B2 | 12/2010 | Carbonera et al. | |
| 8,134,575 B2 | 3/2012 | Wong et al. | |
| 8,319,145 B2 | 11/2012 | Rosario et al. | |
| 8,515,713 B2 | 8/2013 | Carbonera et al. | |
| 8,584,012 B1 | 11/2013 | Orshanskiy et al. | |
| 8,633,930 B2 | 1/2014 | Mansfield | |

(Continued)

*Primary Examiner* — Nicholas Tobergte
(74) *Attorney, Agent, or Firm* — Scherrer Patent & Trademark Law, P.C.; Stephen T. Scherrer; Monique A. Morneault

(57) ABSTRACT

The present invention relates to apparatuses, systems, and methods for defining positions where characters such as text, numbers, symbols, or the like are to be inscribed. Specifically, the positions may correspond with geometric shapes including, without limitation, arcs, circles, angles, lines, rectangles, or the like. Even more specifically, the apparatuses, systems, and methods define the positions using a plurality of points, such that information such as coordinates, angles, radiuses, perimeters, centers, heights, lengths, circumferences, or the like are not required. Further, measuring tools, prints, or operator skill/knowledge is not required.

20 Claims, 5 Drawing Sheets

(56) References Cited

U.S. PATENT DOCUMENTS

| | | | |
|---|---|---|---|
| 2003/0170086 A1* | 9/2003 | Shinoda | B44B 3/002 409/132 |
| 2008/0099433 A1 | 5/2008 | Huang et al. | |
| 2010/0006546 A1* | 1/2010 | Young | B44C 1/228 219/121.69 |
| 2010/0108650 A1 | 6/2010 | Huang et al. | |
| 2012/0009036 A1 | 1/2012 | Marcos et al. | |

* cited by examiner

INSCRIPTION POSITIONING APPARATUSES, SYSTEMS, AND METHODS OF MAKING AND USING THE SAME

The present invention claims priority to U.S. Provisional Patent App. No. 62/145,023, titled "Inscription Positioning Apparatuses, Systems, and Methods of Making and Using the Same", filed Apr. 9, 2015, which is incorporated herein by reference in its entirety.

TECHNICAL FIELD

The present invention relates to inscription positioning apparatuses, systems, and methods of making and using the same.

BACKGROUND

It is, of course, generally known to engrave products with text, numbers, designs, and the like. Engraving usually involves incising characters onto a hard, flat surface by cutting grooves therein. Engraving has multiple uses including individual use and commercial reproduction. Although modern technological advances in photography and printing have almost completely replaced any commercial reproductive use of engraving, individual engraving still exists today. Individual engraving is commonly used in multiple industries including glass, gem, jewelry, gun, metal, and plastic industries. It is often used to insert serial number or other identifying features into otherwise inseparable products or goods.

Generally, engraving may be done with hand tools, with mechanical tools, or with intricate and advanced machines. Tools, such as gravers or burins, have been used for centuries and come in many forms including, without limitation, angled graver, ring graver, round graver, square graver, knife graver, flat graver, v-point graver, mezzotint rockers, roulettes and burnishing tool.

Mechanical tools, such as a pantograph, may be utilized to enlarge, copy, or shrink an engraving. Specifically, a pantograph is a mechanical linkage with a parallelogram connection that produces movements in one location that are identical to movements in another location. The spacing of a pantograph may determine whether an engraving is enlarged, identical, or miniaturized. Tools such as this may be used in combination with hand tools to further enhance hand engraving.

Engraving machines may utilize all of the above tools in combination with a computer to engrave a product. Other engraving machines may use diamond styluses, lasers, or other engraving means to replicate the aforementioned tools. Often, a computer-aided machine engraving machine utilizes three-dimension Cartesian coordinate systems to replicate the angles, depth, and other distinct engravings that hand tools would otherwise provide.

No matter which type of engraving process one uses, mathematics is commonly involved to precisely design the engraving. Specifically, geometry is often used to determine spatial placement of characters, images, and the like. More commonly, vectors, curves, lines, sinusoids, and other complex formulas and functions are used to define and create the engraving. These complex formulas and functions often require knowing the starting point, starting angle, end point, ending angle, coordinates, other angles, radiuses, perimeters, centers, heights, lengths, circumferences, or the like to design the engraving. However, it is common that some or all of these factors are unknown at the time of engraving. A need exists for apparatuses, systems, and methods for estimating the geometry involved with engraving without knowledge of specific factors.

Commonly, someone utilizes these complex formulas and functions to design blueprints for engraving. While blueprints provide a plan for engraving an item or product, they also require precise interpretation and/or measurements by another party before the engraving process may begin. This requires that the interpreter of the blueprint have the skills to understand and comprehend the complex formulas and functions embedded therein. Often, machine operators are not trained to interpret blueprints and lack the necessary skills in order to utilize them properly. Even more frequently, blueprints may not even be available for a particular engraving and therefore the design must be done from scratch. A need, therefore, exists for apparatuses, systems, and methods that do not require advanced training or blueprints.

Additionally, these complex formulas and functions (whether or not they are described in a blueprint) must be programmed into a computer-aided machine engraving machine in order for it to precisely engrave according to the complex formula or function. However, much like the variables the help define the complex formulas and functions, each complex formula or function can vary according to what is needed. A first complex formula or function defining a first shape with a first size in a first location will not be the same as a second complex formula or function defining a second shape with a second size in a second location. Precisely defining each individual complex formula or function in order to engrave an object can become tedious and time consuming. Not only does work need to be performed to define each specific complex formula or function, but work also needs to be performed to enter these specific complex formula or functions into the computer-aided machine engraving machine. This two-step redundancy is not only tedious and time consuming, but it also increases the likelihood for transcription errors. A need, therefore, exists for apparatuses, systems, and methods for estimating specific complex formulas or functions based on a plurality of points and engraving based on said estimation.

SUMMARY OF THE INVENTION

The present invention relates to apparatuses, systems, and methods for defining positions where characters such as text, numbers, symbols, or the like are to be inscribed. Specifically, the positions may correspond with geometric shapes including, without limitation, arcs, circles, angles, lines, rectangles, or the like. Even more specifically, the apparatuses, systems, and methods define the positions using a plurality of points, such that information such as coordinates, angles, radiuses, perimeters, centers, heights, lengths, circumferences, or the like are not required. Further, measuring tools, prints, or operator skill/knowledge is not required.

To this end, in an embodiment of the present invention, an engraving apparatus for engraving at least one character into an object is provided. The engraving apparatus comprises: a processor programmed to receive location information of at least one point on the object relating to a first pre-defined shape, the processor further programmed to modify the first pre-defined shape based on the at least one point to form a modified shape, the processor further programmed to calculate a shape equation based on the modified shape, and the processor further programmed to define an engraving path on the object for at least one character based on the shape equation; and a mechanically controlled engraving tip electrically connected to the processor, the engraving tip configured to engrave an object with the at least one character along the engraving path.

In an embodiment, the pre-defined shape is selected from the group consisting of an arc, a line and a rectangle.

In an embodiment, the pre-defined shape is an arc, and the processor is programmed to receive at least three points on the object.

In an embodiment, the pre-defined shape is an arc, and the processor is programmed to receive no more than three points on the object.

In an embodiment, the pre-defined shape is a line, and the processor is programmed to receive at least one point on the object.

In an embodiment, the pre-defined shape is a line, and the processor is programmed to receive no more than one point on the object.

In an embodiment, the pre-defined shape is a line, and the processor is programmed to receive no more than two points on the object.

In an embodiment, the pre-defined shape is a rectangle, and the processor is programmed to receive at least two points on the object.

In an embodiment, the pre-defined shape is a rectangle, and the processor is programmed to receive no more than two points on the object.

In an embodiment, the engraving tip is configured to input the location information of the at least one point into the processor to define the engraving path.

In an alternate embodiment of the present invention, a method of engraving an object with at least one character is provided. The method comprises the steps of: providing an engraving apparatus comprising a processor programmed to receive location information of at least one point on the object relating to a first pre-defined shape, the processor further programmed to modify the first pre-defined shape based on the at least one point to form a modified shape, the processor further programmed to calculate a shape equation based on the modified shape, and the processor further programmed to define an engraving path on the object for at least one character based on the shape equation, wherein the engraving apparatus further comprises a mechanically controlled engraving tip electrically connected to the processor, the engraving tip configured to engrave an object with the at least one character along the engraving path; inputting the location information of the at least one point into the processor relating to the first pre-defined shape; modifying the first pre-defined shape based on the at least one point to form a modified shape; calculating a shape equation based on the modified shape; defining an engraving path on the object for the at least one character based on the shape equation; and engraving at least one character on the object based on the engraving path.

In an embodiment, the at least one point is input into the processor by the engraving tip.

In an embodiment, the method further comprises the step of: inputting the location information of the at least one point into the processor by touching the object with the engraving tip.

In an embodiment, the pre-defined shape is selected from the group consisting of an arc, a line and a rectangle.

In an embodiment, the pre-defined shape is an arc, and the processor receives the location information of no more than three points on the object.

In an embodiment, the pre-defined shape is a line, and the processor is programmed to receive the location information of no more than one point on the object.

In an embodiment, the pre-defined shape is a line, and the processor is programmed to receive no more than two points on the object.

In an embodiment, the pre-defined shape is a rectangle, and the processor is programmed to receive location information of no more than 2 points on the object.

In an embodiment, the location information of the at least one point is received by the processor from a camera.

In an embodiment, the at least one point is received by the processor from an input device selected from the group consisting of a keyboard, a mouse, a touchscreen and combinations thereof.

It is, therefore, an advantage and objective of the present invention to provide for apparatuses, systems, and methods for estimating the geometry involved with engraving without knowledge of specific factors.

It is an advantage and objective of the present invention to provide apparatuses, systems, and methods that do not require blueprints or advanced training.

It is an advantage and objective of the present invention to provide apparatuses, systems, and methods for estimating specific complex formulas or functions based on a plurality of points and engraving based on said estimation.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

The present invention relates to apparatuses, systems, and methods for defining positions where characters such as text, numbers, symbols, or the like are to be inscribed. Specifically, the positions may correspond with geometric shapes including, without limitation, arcs, circles, angles, lines, rectangles, or the like. Even more specifically, the apparatuses, systems, and methods define the positions using a plurality of points, such that information such as coordinates, angles, radiuses, perimeters, centers, heights, lengths, circumferences, or the like are not required. Further, measuring tools, prints, or operator skill/knowledge is not required.

Now referring to the figures, wherein like numerals refer to like parts, FIG. 1 illustrates a series of physical steps for estimating the curvature of an arc for engraving along the path of the estimated arc. Specifically, an engraving machine may be equipped with an engraving tip 10 that is generally used to engrave characters into an object 12. The engraving tip 10 may be mechanically connected to the engraving machine such that the engraving tip 10 may move in a plurality of directions. The engraving tip 10 may be connected to a plurality of motors that may advance the engraving tip 10 based on motorized movement controlled electronically through an input device, such as a keyboard, touchscreen, mouse, joystick, number pad, arrow keys, or the like. Alternatively, the engraving tip 10 may be manually adjusted through the use of levers, gears, knobs, a user's hands, or other like physical instrument.

Figure 1A:
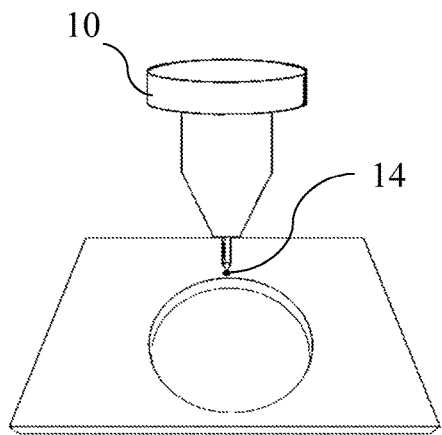
FIGS. 1A-1D illustrate a plurality of physical steps for inputting a plurality of points relating to an arc in an embodiment of the present invention.

Under the present invention, the engraving tip 10 may be used as a pointer to traverse to at least one or plurality of points on the object to be engraved for inputting the same into the computer memory of the engraving machine. Alternatively, the at least one or the plurality of points may be entered using a pointer, camera, or other indication device disposed on the apparatus and manually adjustable by a user. In another alternate embodiment, the coordinates of the plurality of points may be entered with input devices such as a keyboard, a mouse, a touchscreen, or the like instead of positioning the engraving tip 10 or other indication device. Specifically, as shown in FIG. 1A, a first arc point 14 may be input into the computer memory of the engraving machine by moving the engraving tip 10 above the first arc point 14. The first arc point 14 may be recorded into the computer memory automatically (such as upon recognition of a stop of motion, a pre-defined pause, or the like), may be registered by an act of a user (such as by engaging a button or other input), or by any other method known to one skilled in the art. As shown in FIG. 1A the first arc point 14 may be a center point along a pre-defined arc or circle.

Figure 1B:
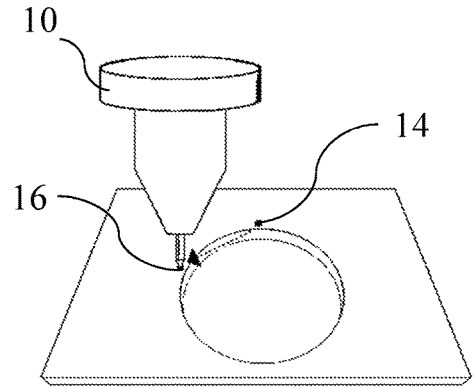
Figure 1C:
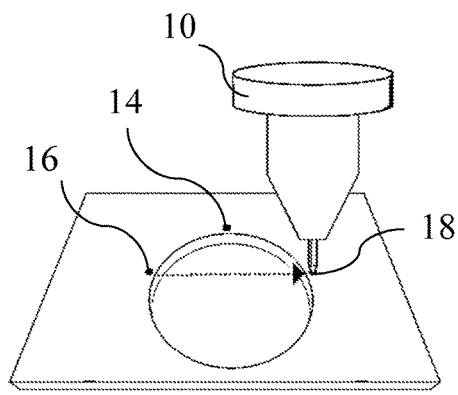
Figure 1D:
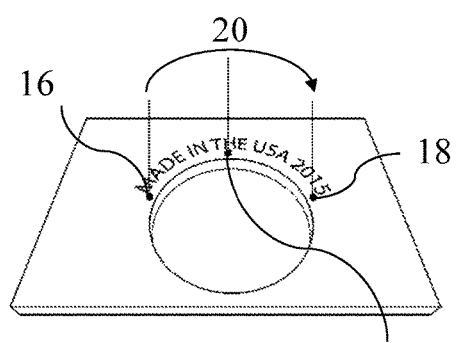

As shown in FIG. 1B, a second arc point 16 may be input into the computer memory of the engraving machine by moving the engraving tip 10 above the second arc point 16. As previous discussed, the second arc point 16 may be recorded automatically, upon an act of a user, or the like. Similarly, a third arc point 18 may be input by moving the engraving tip 10 above the third arc point 18, as shown in FIG. 1C. The second arc point 16 and the third arc point 18 may be end points of an arc, or may just be other points along an arc or circle. By defining the first arc point 14, the second arc point 16, and the third arc point 18, a processor electronically connected to the computer memory may manipulate the plurality of arc points into an estimate equation of an arc for engraving along a first path 20 defined by said estimate equation and the plurality of arc points. FIG. 1D shows an example of characters engraved along the first path 20. Of course, it should be noted that while the present invention describes the first arc point, the second arc point, and the third arc point input into the processor serially and consecutive, the plurality of points may be entered into the processor in any order and the invention should not be limited as described herein.

Characters to be engraved along the first path 20 may be input into the computer memory of the engraving machine prior to selecting the plurality of arc points, after selecting the plurality of arc points, during selection of the plurality of arc points, or any combination thereof. These characters may be entered by any method known to one skilled in the art including, without limitation, by keyboard, touchscreen, mouse, character recognition software, and the like. After the first path 20 is defined, the characters to be engraved may be pulled from the computer memory and engraved by the engraving tip 10 along the first path 20. The characters to be engraved may have dimensional properties such as height and length, other character properties such as font type, bold, italicize, underline, strikethrough, subscript, superscript, and other properties known to one skilled in the art. These properties may be defined by default, by a user, and any combination thereof.

In a non-limiting embodiment, wherein the second arc point 16 and the third arc point 18 are end points, any character engraving may be positioned from end point to end point. In another non-limiting embodiment, wherein the second arc point 16 and the third arc point 18 are not end points, any character engraving may be so-called center-justified and may extend outwardly from an estimated mid-point until engraving is complete. Alternatively, the characters may be engraved right justified, left justified, or in any other position in the engraving path, and the invention should not be limited.

In a non-limiting embodiment, the present invention may estimate the first path 20 from the plurality of arc points and the basic equation of a circle: $x^2+y^2+a*x+b*y+c=0$. Specifically, the first arc point 14 may have x and y coordinates, (x1, y1), which may be inserted into the aforementioned equation. Using the first arc point 14 coordinates, the equation may become: $x1^2+y1^2+a*x1+b*y1+c=0$. Similarly, the second arc point 16 may have x and y coordinates, (x2, y2), which may make the equation: $x2^2+y2^2+a*x2+b*y2+c=0$. Lastly, the third arc point 18 may have x and y coordinates, (x3, y3), which may make the equation: $x3^2+y3^2+a*x3+b*y3+c=0$. The processor may solve these equations to discover the values of constants a, b, and c using the x and y coordinates of the first arc point 14, the second arc point 16, and the third arc point 18. Thereafter, the processor may define an equation for the arc by inserting the solved for constants into the equation $x^2+y^2+a*x+b*y+c=0$. The processor may use said equation to define the first path 20 for engraving characters about said path.

Figure 2A:
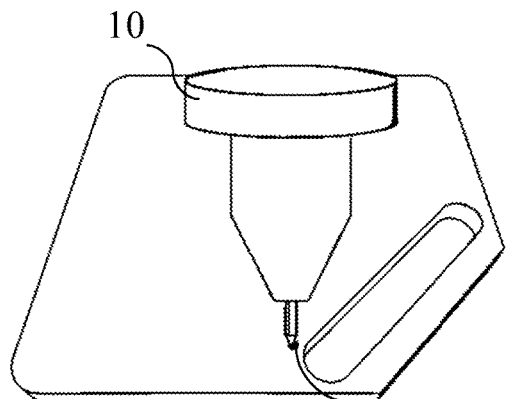
FIGS. 2A-2C illustrate a plurality of physical steps for inputting a plurality of points relating to an angle in an embodiment of the present invention.
Figure 2B:
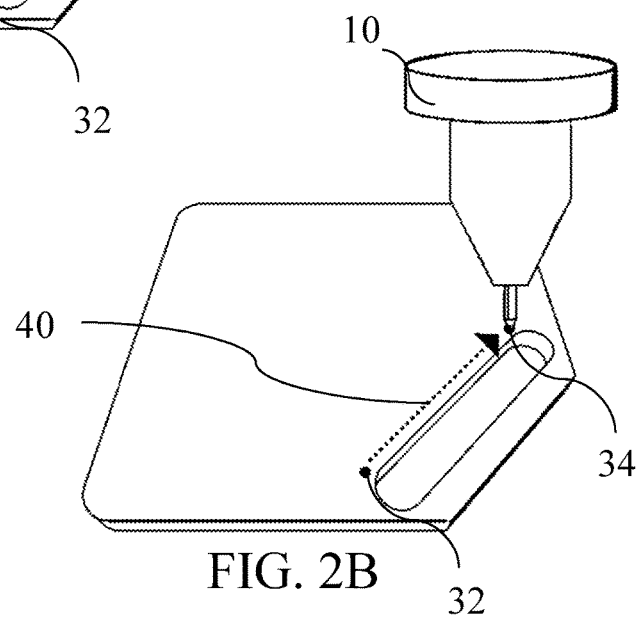
Figure 2C:
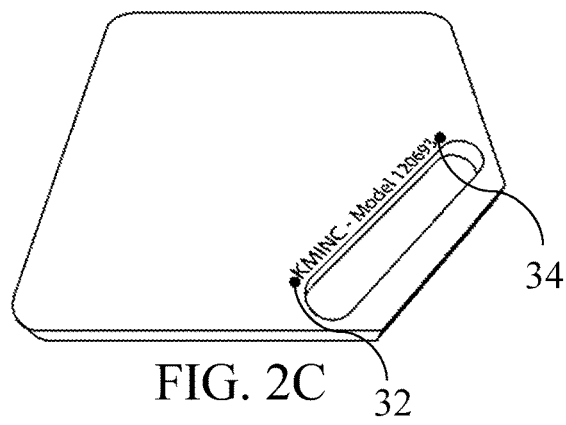

As shown in FIGS. 2A-2C, a second path 40 may be defined by inputting a plurality of line points. Specifically, the engraving tip 10 may be positioned above a first line point 32, as shown in FIG. 2A. The first line point 32 may be subsequently recorded into the computer memory as discussed herein or by any alternative method known to one skilled in the art. The engraving tip 10 may then be positioned over a second line point 34, as shown in FIG. 2B. The second line point 34 may be similarly recorded into the computer memory. The first line point 32 and the second line point 34 may be any two points along a proposed line, may be end points of the proposed line, or any combination thereof. By defining the first line point 32 and the second line point 34, the processor may manipulate the plurality of line points into an estimate equation of a line for engraving along the second path 40 defined by said estimate equation and the plurality of line points. FIG. 2C shows an example of characters engraved along the second path 40. As discussed above, the engraved characters may extend from end point to end point, may be center justified so to extend continuously along the second path 40 until completion, or other alternative character placement method known to one skilled in the art.

Characters to be engraved along the second path 40 may be input into the computer memory of the engraving machine prior to selecting the plurality of line points, after selecting the plurality of line points, during selection of the plurality of line points, or any combination thereof. These characters may be entered by any method known to one skilled in the art including, without limitation, by keyboard, touchscreen, mouse, character recognition software, and the like. After the second path 40 is defined, the characters to be engraved may be pulled from the computer memory and engraved by the engraving tip 10 along the second path 40. The characters to be engraved may have dimensional properties such as height and length, other character properties such as font type, bold, italicize, underline, strikethrough, subscript, superscript, and other properties known to one skilled in the art. These properties may be defined by default, by a user, and any combination thereof.

In a non-limiting embodiment, the present invention may estimate the second path 40 from the plurality of line points and the basic equation of a line: $y=a*x+b$. Specifically, the first line point 32 may have x and y coordinates, $(x1, y1)$, which may be inserted into the aforementioned equation. Using the first line point 32 coordinates, the equation may become: $y1=a*x1+b$. Similarly, the second line point 34 may have x and y coordinates, $(x2, y2)$, which may make the equation: $y2=a*x2+b$. The processor may solve these equations to discover the values of constants a and b using the x and y coordinates of the first line point 32 and the second line point 34. Thereafter, the processor may define an equation for the line by inserting the solved for constants into the equation $y=a*x+b$. The processor may use said equation to define the second path 40 for engraving characters about said second path 40.

Figure 3A:
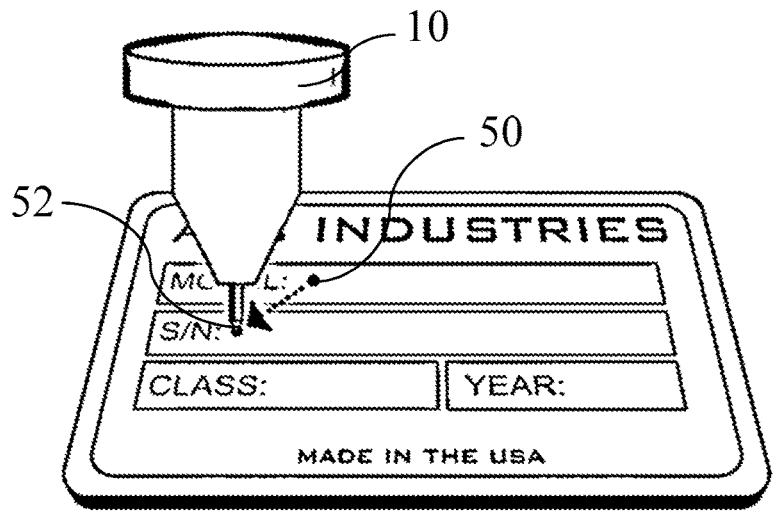
FIGS. 3A-3C illustrate a plurality of physical steps for inputting a plurality of points relating to engraving start points in an embodiment of the present invention.
Figure 3B:
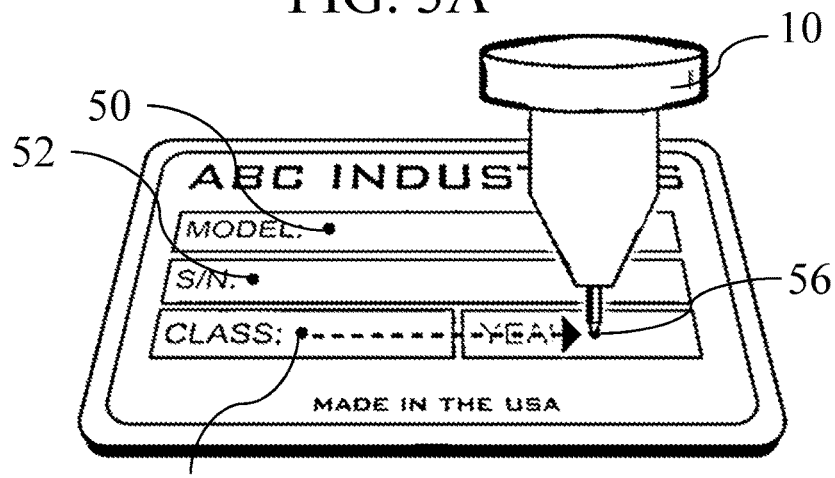
Figure 3C:
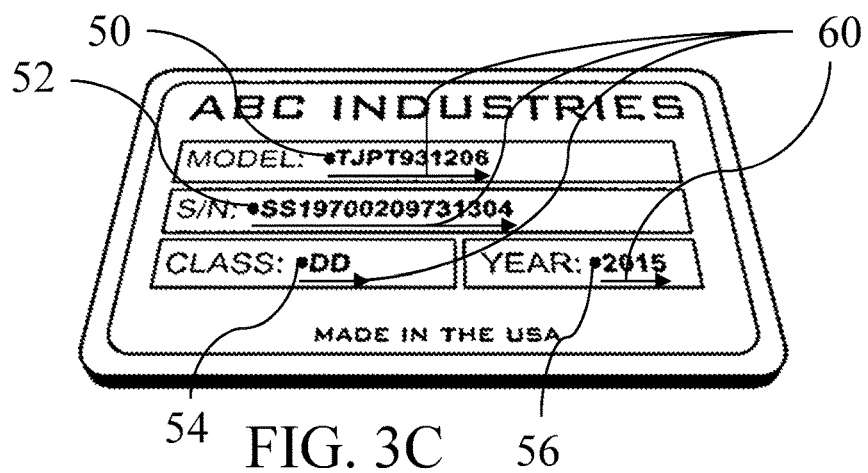

As shown in FIGS. 3A-3C, multiple starting points may be input into the computer memory. Specifically, the engraving tip 10 may be positioned above a plurality of starting points including a first starting point 50 and a second starting point 52, as shown in FIG. 3A. The first starting point 50 and second starting point 52 may be recorded into the computer memory as discussed herein or by any alternative method known to one skilled in the art. The engraving tip 10 may then be positioned over a third starting point 54 and a fourth starting point 56, as shown in FIG. 3B. The third starting point 54 and fourth starting point 56 may be similarly recorded into the computer memory. Of course, any number of starting points may be recorded as needed for the engraving. By defining each starting point as taught herein, the processor may define a plurality of character placement paths 60 from each starting point. FIG. 3C shows an example of characters engraved along the plurality of character placement paths 60. The engraved characters may extend from each starting point rightward, leftward, rightward and leftward (center justified), or other alternative character placement method known to one skilled in the art.

Characters to be engraved from each starting point may be input into the computer memory of the engraving machine, with particular characters associated with each starting point. The characters may be input prior to selecting the plurality of starting points, after selecting the plurality of starting points, during selection of the plurality of starting points, or any combination thereof. These characters may be entered by any method known to one skilled in the art including, without limitation, by keyboard, touchscreen, mouse, character recognition software, and the like. After the plurality of starting points are defined, the characters to be engraved may be pulled from the computer memory and engraved by the engraving tip 10 from each starting point. The characters to be engraved may have dimensional properties such as height and length, other character properties such as font type, bold, italicize, underline, strikethrough, subscript, superscript, and other properties known to one skilled in the art. These properties may be defined by default, by a user, and any combination thereof.

In a non-limiting embodiment, the processor may be programmed to obtain each starting point from memory, return the engraving tip 10 to the first starting point 50, and begin character engraving until every character associated with the first starting point 50 is engraved. Then, the processor may move the engraving tip 10 to the next starting point, the second starting point 52 in an example, and start character engraving again. The processor may repeat this process as many times as there are starting points to completely engrave the product.

Figure 4A:
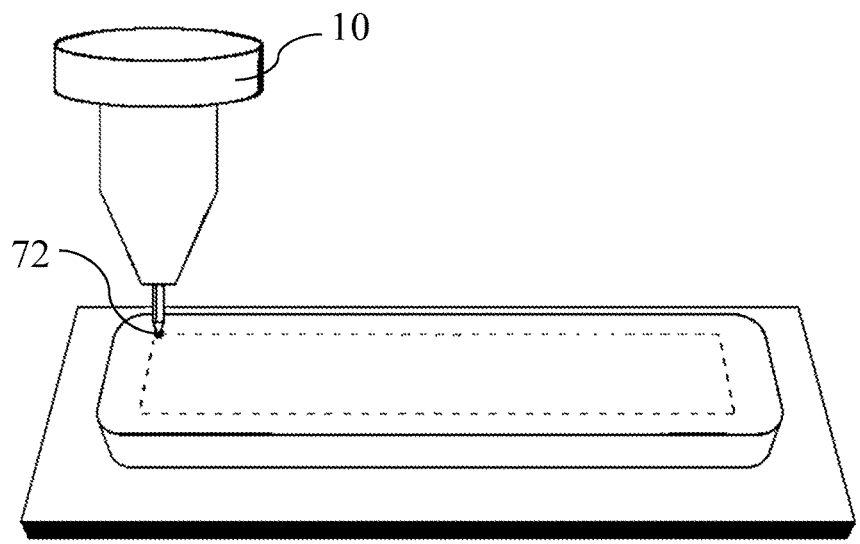
FIGS. 4A-4C illustrate a plurality of physical steps for inputting a plurality of points relating to a rectangle in an embodiment of the present invention.
Figure 4B:
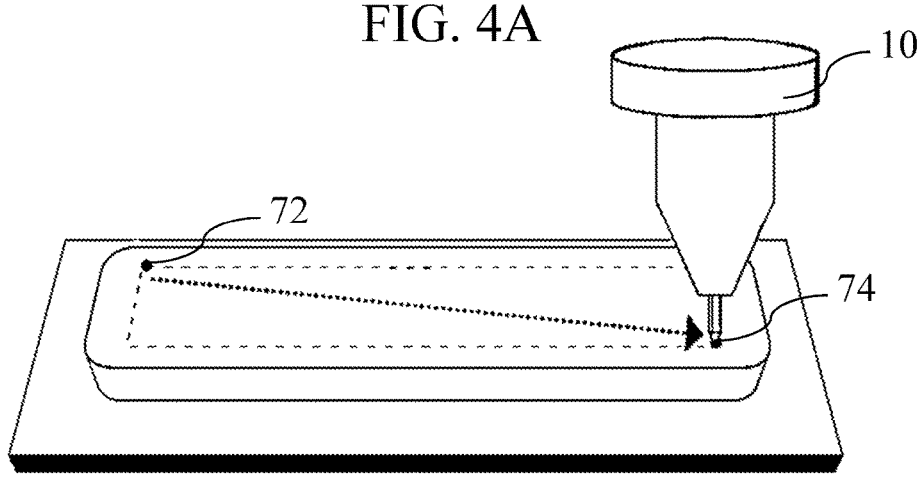
Figure 4C:
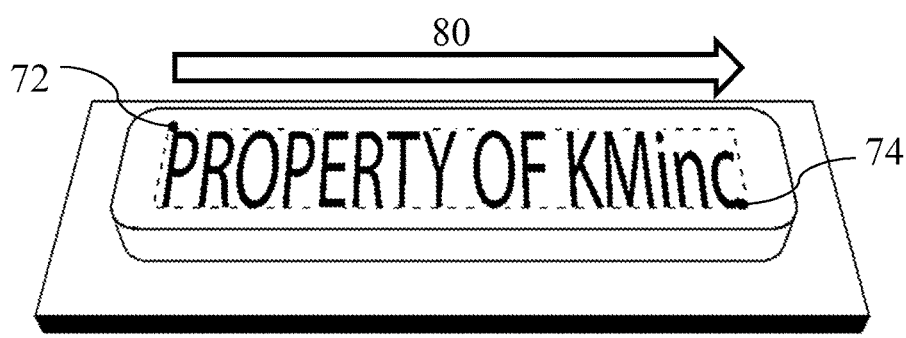

As shown in FIGS. 4A-4C, a third path 80 may be defined by inputting at least two corner points. Specifically, the engraving tip 10 may be positioned above a first corner point 72, as shown in FIG. 4A, which may be the upper left corner of a rectangle in one example. The first corner point 72 may be subsequently recorded into the computer memory as discussed herein or by any alternative method known to one skilled in the art. The engraving tip 10 may then be positioned over a second corner point 74, as shown in FIG. 4B, which may be the lower right corner of a rectangle in one example. The second corner point 74 may be similarly recorded into the computer memory. By defining the first corner point 72 and the second corner point 74, the processor may manipulate the plurality of corner points into an estimate equation of a rectangle for engraving along the third path 80 defined by said estimate equation of the rectangle and the plurality of corner points. FIG. 4C shows an example of characters engraved along the third path 80. As discussed above, the engraved characters may extend from end point to end point, may be center justified so to extend continuously along the third path 80 until completion, or other alternative character placement method known to one skilled in the art.

Characters to be engraved along the third path 80 may be input into the computer memory of the engraving machine prior to selecting the plurality of corner points, after selecting the plurality of corner points, during selection of the plurality of corner points, or any combination thereof. These characters may be entered by any method known to one skilled in the art including, without limitation, by keyboard, touchscreen, mouse, character recognition software, and the like. After the third path 80 is defined, the characters to be engraved may be pulled from the computer memory and engraved by the engraving tip 10 along the third path 80. The characters to be engraved may have dimensional properties such as height and length, other character properties such as font type, bold, italicize, underline, strikethrough, subscript, superscript, and other properties known to one skilled in the art. These properties may be specifically defined by the estimate equation of the rectangle, such that the height and length of the characters fit the boundaries of the estimated rectangular shape. Alternatively, the dimensions may be defined by a user or by an alternate method known to one skilled in the art.

In a non-limiting embodiment, the present invention may estimate the third path 80 from the plurality of corner points. Specifically, the first corner point 72 may have x and y coordinates, $(x1, y1)$. Similarly, the second corner point 74 may have x and y coordinates, $(x2, y2)$. From these coordinates, the length and height of a rectangle may be determined by the processor. Specifically, the height of the rectangle may be determined by the equation: $H=y2-y1$. Similarly, the length of the rectangle may be determined by the equation: $L=x2-x1$. The processor may then use the first corner point 72 as a starting point and define a rectangle with a height H from the first corner point 72 and a length L from the first corner point 72. Thereafter, the processor may define the third path 80 as within the defined rectangle for engraving characters about said third path 80.

Figure 5:
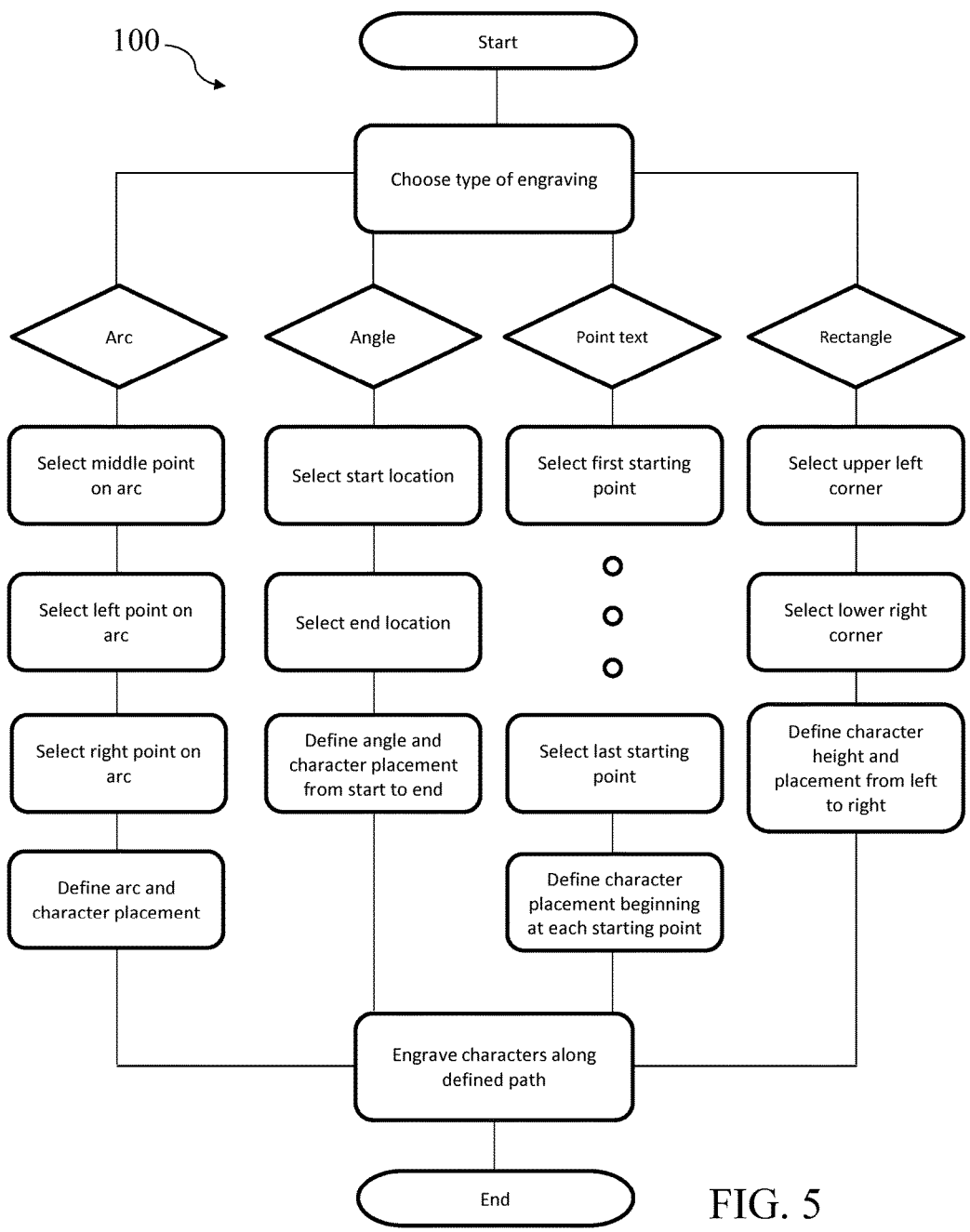
FIG. 5 illustrates a flow chart defining an algorithm in an embodiment of the present invention.

A flowchart 100 is shown in FIG. 5. The flowchart 100 describes the algorithms embedded within the engraving machine, and more specifically, programmed within the processor of the engraving machine. In particular, the engraving machine may be programmed to define the first path 20, the second path 40, the plurality of character placement paths 60, and the third path 80. Specifically, in one embodiment, a user may select which path type is required for engraving, whether an arc, angle, point text, or rectangle. Of course, other path types may be utilized by the present invention. Once a path type is selected, the selected path type may be defined according to the particular method described in the preceding paragraphs. Thereafter, characters associated with the selected path and saved into the computer memory may be engraved along the defined path.

Alternatively, in another embodiment, each path type may be defined based upon the inputs of a user prior to selection of a particular path type. For example, if a user inputs two points, the processor may begin to define a line, a rectangle, two starting points, and an arc based on the two points. The user may then inform the engraving machine that these two points are to be associated with a particular path type, and the other path types may be disregarded or saved It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. An engraving apparatus for engraving at least one character into an object comprising:
    a processor programmed to receive location information of at least one point on the object relating to a first pre-defined shape, the processor further programmed to modify the first pre-defined shape based on the at least one point to form a modified shape, the processor further programmed to calculate a shape equation based on the modified shape, and the processor further programmed to define an engraving path on the object for at least one character based on the shape equation;
    a mechanically controlled engraving tip electrically connected to the processor, the engraving tip configured to engrave an object with the at least one character along the engraving path.

2. The engraving apparatus of claim 1 wherein the pre-defined shape is selected from the group consisting of an arc, a line and a rectangle.

3. The engraving apparatus of claim 1 wherein the pre-defined shape is an arc, and the processor is programmed to receive at least 3 points on the object.

4. The engraving apparatus of claim 1 wherein the pre-defined shape is an arc, and the processor is programmed to receive no more than 3 points on the object.

5. The engraving apparatus of claim 1 wherein the pre-defined shape is a line, and the processor is programmed to receive at least one point on the object.

6. The engraving apparatus of claim 1 wherein the pre-defined shape is a line, and the processor is programmed to receive no more than 1 point on the object.

7. The engraving apparatus of claim 1 wherein the pre-defined shape is a line, and the processor is programmed to receive no more than 2 points on the object.

8. The engraving apparatus of claim 1 wherein the pre-defined shape is a rectangle, and the processor is programmed to receive at least 2 points on the object.

9. The engraving apparatus of claim 1 wherein the pre-defined shape is a rectangle, and the processor is programmed to receive no more than 2 points on the object.

10. The engraving apparatus of claim 1 wherein the engraving tip is configured to input the location information of the at least one point into the processor to define the engraving path.

11. A method of engraving an object with at least one character, the method comprising the steps of:
    providing an engraving apparatus comprising a processor programmed to receive location information of at least one point on the object relating to a first pre-defined shape, the processor further programmed to modify the first pre-defined shape based on the at least one point to form a modified shape, the processor further programmed to calculate a shape equation based on the modified shape, and the processor further programmed to define an engraving path on the object for at least one character based on the shape equation,
    wherein the engraving apparatus further comprises a mechanically controlled engraving tip electrically connected to the processor, the engraving tip configured to engrave an object with the at least one character along the engraving path;
    inputting the location information of the at least one point into the processor relating to the first pre-defined shape;
    modifying the first pre-defined shape based on the at least one point to form a modified shape;
    calculating a shape equation based on the modified shape;
    defining an engraving path on the object for the at least one character based on the shape equation; and
    engraving at least one character on the object based on the engraving path.

12. The method of claim 11 wherein the at least one point is input into the processor by the engraving tip.

13. The method of claim 11 further comprising the step of:
    inputting the location information of the at least one point into the processor by touching the object with the engraving tip.

14. The method of claim 11 wherein the pre-defined shape is selected from the group consisting of an arc, a line and a rectangle.

15. The method of claim 11 wherein the pre-defined shape is an arc, and the processor receives the location information of no more than three points on the object.

16. The method of claim 11 wherein the pre-defined shape is a line, and the processor is programmed to receive the location information of no more than one point on the object.

17. The method of claim 11 wherein the pre-defined shape is a line, and the processor is programmed to receive no more than two points on the object.

18. The method of claim 11 wherein the pre-defined shape is a rectangle, and the processor is programmed to receive location information of no more than 2 points on the object.

19. The method of claim 11 wherein the location information of the at least one point is received by the processor from a camera.

20. The method of claim 11 wherein the at least one point is received by the processor from an input device selected from the group consisting of a keyboard, a mouse, a touchscreen and combinations thereof.

* * * * *